(12) United States Patent
Mochida et al.

(10) Patent No.: US 7,904,666 B2
(45) Date of Patent: Mar. 8, 2011

(54) ACCESS CONTROL DEVICE, ACCESS CONTROL INTEGRATED CIRCUIT, AND ACCESS CONTROL METHOD

(75) Inventors: Tetsuji Mochida, Osaka (JP); Ryuta Nakanishi, Kyoto (JP); Takaharu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 535 days.

(21) Appl. No.: 11/917,574

(22) PCT Filed: Jul. 6, 2006

(86) PCT No.: PCT/JP2006/313462

§ 371 (c)(1),
(2), (4) Date: Dec. 14, 2007

(87) PCT Pub. No.: WO2007/004696

PCT Pub. Date: Jan. 11, 2007

(65) Prior Publication Data

US 2009/0313441 A1 Dec. 17, 2009

(30) Foreign Application Priority Data

Jul. 6, 2005 (JP) .............................. 2005-197141

(51) Int. Cl.
*G06F 12/00* (2006.01)

(52) U.S. Cl. ........................ 711/147; 711/150; 711/151; 710/117; 710/240

(58) Field of Classification Search ................. 711/147, 711/150–152; 710/116–117, 240, 244
See application file for complete search history.

(56) References Cited

U.S. PATENT DOCUMENTS 6,804,738 B2  10/2004  Weber (Continued)

FOREIGN PATENT DOCUMENTS

JP   7-153268   6/1995

(Continued)

OTHER PUBLICATIONS

European Search Report issued Jun. 23, 2009 in the European Application 6767921.7 corresponding to the present application U.S. National Stage.

(Continued)

*Primary Examiner*—Jasmine Song
(74) *Attorney, Agent, or Firm*—Wenderoth, Lind & Ponack, L.L.P.

(57) ABSTRACT

In a device, in which a master that requires access at a predetermined rate and a processor that requires responsiveness to an access request access a shared memory, responsiveness to the access request of the processor is improved while the access of the master at the predetermined rate is guaranteed, compared to conventional technologies. When the master has a resource available for accessing the shared memory, the master accesses the shared memory at the predetermined rate or above. When the access is executed at the predetermined rate or above, the processor accesses the shared memory by using a resource that was originally allocated to the master.

8 Claims, 10 Drawing Sheets

U.S. PATENT DOCUMENTS

| | | |
|---|---|---|
| 2003/0074507 A1 | 4/2003 | Weber |
| 2004/0019749 A1 | 1/2004 | Mochida et al. |
| 2004/0073730 A1* | 4/2004 | Horii et al. .................. 710/113 |
| 2005/0132038 A1 | 6/2005 | Inoue et al. |

FOREIGN PATENT DOCUMENTS

| | | |
|---|---|---|
| JP | 11-120124 | 4/1999 |
| JP | 2000-207355 | 7/2000 |
| JP | 2002-304368 | 10/2002 |
| JP | 2004-5589 | 1/2004 |
| WO | 02/054238 | 7/2002 |
| WO | 03/034242 | 4/2003 |
| WO | 2005/048097 | 5/2005 |
| WO | 2006/001245 | 1/2006 |

OTHER PUBLICATIONS

International Search Report issued Oct. 17, 2006 in the International (PCT) Application of which the present application is the U.S. National Stage.

* cited by examiner

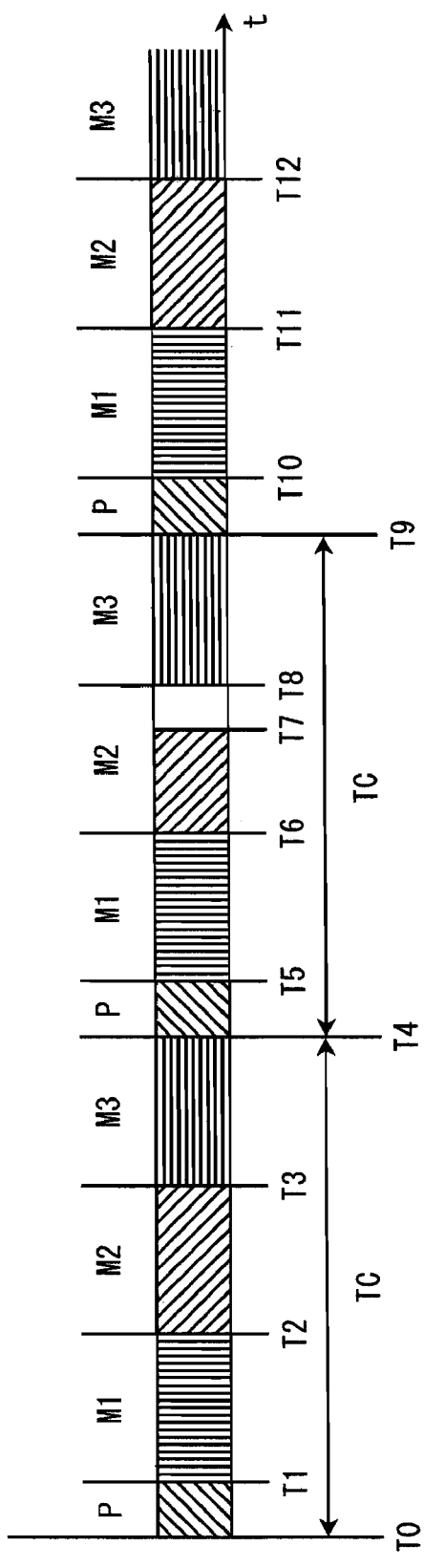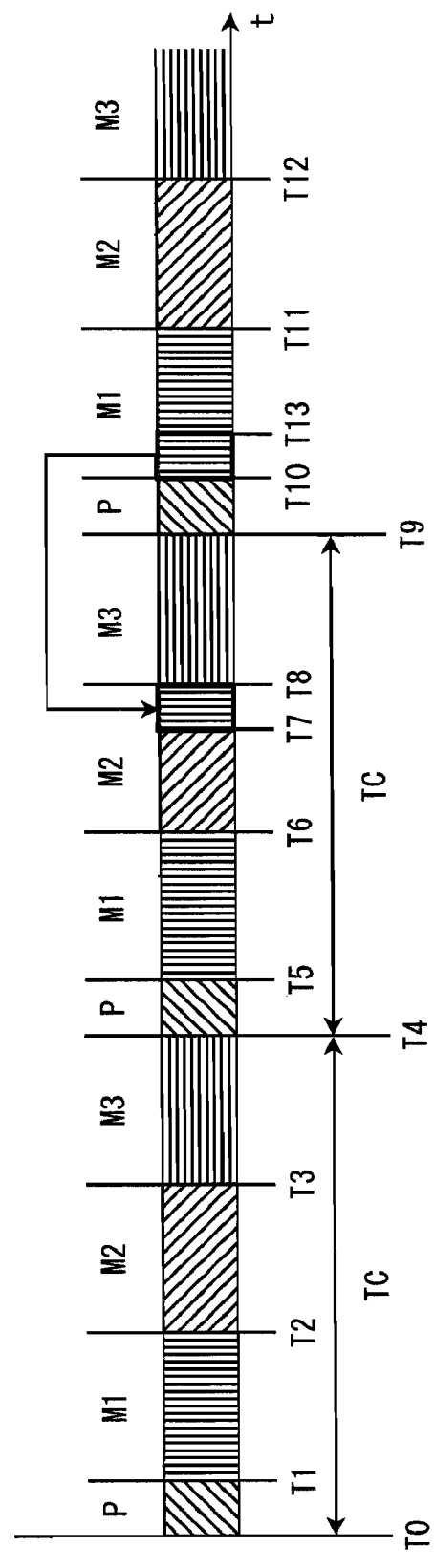

US 7,904,666 B2

ACCESS CONTROL DEVICE, ACCESS CONTROL INTEGRATED CIRCUIT, AND ACCESS CONTROL METHOD

BACKGROUND OF THE INVENTION

1. Field of Invention

The present invention relates to an access control device that executes access control when a plurality of masters access a shared memory, and more particularly relates to a technique for improving responsiveness to an access request from a master whose occurrence of the access request is difficult to predict.

2. Description of the Related Art

There has been a system in which two types of masters share a same memory. One type of the masters requires access to be guaranteed at a predetermined rate within a fixed period. The other type of the masters (hereinafter referred to as processor) requests access to the memory irregularly and thus is difficult to predict the frequency of the access requests. Such a system has an arbitration circuit that arbitrates between the master and the processor to prevent an access conflict over the memory therebetween. Such arbitration circuits often execute access control by setting access priorities for the master and the processor. The following Patent Documents 1 and 2 disclose techniques to improve responsiveness to an access request from the processor in the above-described system.

For example, Patent Document 1 discloses a technique that permits the master to only access the memory with a predetermined frequency and normally prioritizes access of the processor. In the technique disclosed by patent Document 2, normally, an access priority of the processor is set to be low, and an access priority of the master is set to be high. However, if an access request of the processor occurs, and access to the shared memory is granted, the priority of the next access request from the processor is set to be higher than the other master.

[Patent Document 1] Japanese Laid-open Patent Application No. 2000-207355; and

[Patent Document 2] Japanese Laid-open Patent Application No. 2002-304368.

BRIEF SUMMARY OF THE INVENTION

However, in a case that access to the shared memory is controlled periodically as seen in the above-described Patent Document 1, an access request from the processor whose access request occurs unexpectedly is handled during the access of the master that requires a periodical access control. When an access request occurs from the processor during a time slot allocated to the master, the access request is forced to be delayed and thus is problematic in terms of responsiveness to the access request. Also, in the case of the technique described in Patent Document 2, the access of the master at the predetermined rate may not be guaranteed when an access request of the processor has been prioritized.

In view of the above-described problems, the object of the present invention is to provide an access control device having improved responsiveness to an access request from the processor, when compared with conventional technologies.

In order to solve the above-described problems, the present invention provides an access control device that controls access of a plurality of masters to a shared memory, the access control device comprising: a first access control unit operable to cause a first master to access the shared memory, by securing a first access resource to guarantee the access of the first access control unit at a predetermined rate, and when a second access resource is available, cause the first master to access the shared memory at the predetermined rate or above, by securing the second access resource in addition to the first access resource; and a second access control unit operable to, when the first access control unit has caused the first master to access the shared memory at the predetermined rate or above, cause a second master to access the shared memory, by securing the first access resource for the second master to access the shared memory. Further, an upper limit of an amount of data transferred during the access by the second access control unit using the first access resource is set at a difference between (i) a total of an amount of data transferred during the access at the predetermined rate by the first master and an amount of data transferred during the access at more than the predetermined rate by the first master, and, (ii) the amount of data transferred during the access at the predetermined rate by the first master.

With the above-described structure, when a resource for accessing the shared memory is available for the first master, which executes access at a predetermined rate, and the first access control unit has a waiting access request, the first access control unit causes the first master to access the shared memory at more than the originally set rate. This means that the first master accesses the shared memory more than the originally set rate, resulting in having a margin in the resource for the access to be executed periodically. Accordingly, in a case that the second access control unit receives an access request from the second master while having the margin, the second access control unit can allocate, to the second master, the resource that is allocated to the first master, thereby improving responsiveness to the access request from the second master. In this way, when the second master is a processor whose occurrence of an access request to the shared memory is unpredictable, responsiveness to the access request from the processor is improved compared to the conventional technologies.

The access control device may further comprise an advance access count unit operable to count, when the first master has executed the access at the predetermined rate or above, the number of times the first master has accessed the shared memory at more than the predetermined rate, wherein the second access control unit causes the second master to access the shared memory, when the number of accesses counted by the advance access counter is 1 or more.

With the above-described structure, the access control device counts the number of accesses, which indicates the number of times the first master executes access at a predetermined rate or above. Then, using this access counter, the access control device judges whether or not to permit an access request from the second master.

Also, the advance access count unit may execute, when the second access control unit has caused the second master to access the shared memory, one of (i) decrementing the number of accesses that are being counted and (ii) resetting the number of accesses to zero.

With the above-described structure, the access control device prevents the second master from accessing the shared memory excessively, and guarantees the first master the access to the shared memory at a predetermined rate.

Also, the access control device may further comprise: a parameter storage unit that stores a rate parameter for specifying the predetermined rate, wherein the first access control unit causes the first master to execute access at the predetermined rate, based on the predetermined rate stored in the parameter storage unit.

With the above-described parameter storage unit, the first access control unit can guarantee the access at a predetermined rate correctly. Also, with a structure in which a user can freely set the parameter stored in the parameter storage unit, versatility as a device for controlling data access is increased.

The access control device may further comprise: a general access unit operable to, when the first master and the second master share the resource for accessing the shared memory, cause the first master to lend and borrow an access right to/from the second master, within a range of the shared resource, the access right being for accessing the shared memory, thereby causing the second master to access the shared memory.

With the general access control unit, the first master and the second master can lend and borrow the resource when accessing the shared memory. Furthermore, responsiveness to an access request from the second master can be improved.

The access control device may further comprise: a borrowing parameter storage unit that stores (i) information indicating access-guaranteed periods of the first master and the second master, (ii) permissive access frequency information indicating a maximum number of accesses that are permitted during the access-guaranteed period, (iii) information indicating a maximum period in which the access right is permitted to be borrowed, and (iv) information indicating time between a preceding borrowing of the access right and a subsequent borrowing thereof. In addition, the general access unit, based on the pieces of information stored in the borrowing parameter storage unit, causes the first master to lend and borrow the access right to/from the second master, so that the first master and the second master access the shared memory.

With the above-described structure, with a structure in which a user can freely set the parameter stored in the borrowing parameter storage unit, versatility as a device for controlling data access is increased.

Furthermore, an access control integrated circuit that controls access of a plurality of masters to a shared memory, the access control integrated circuit may comprise: a first access control unit operable to cause a first master to access the shared memory, by securing a first access resource to guarantee the access of the first access control unit at a predetermined rate, and when a second access resource is available, cause the first master to access the shared memory at the predetermined rate or above, by securing the second access resource in addition to the first access resource; and a second access control unit operable to, when the first access control unit has caused the first master to access the shared memory at the predetermined rate or above, cause a second master to access the shared memory, by securing the first access resource for the second master to access the shared memory. In addition, an upper limit of an amount of data transferred during the access by the second access control unit using the first access resource is set at a difference between (i) a total of an amount of data transferred during the access at the predetermined rate by the first master and an amount of data transferred during the access at more than the predetermined rate by the first master, and, (ii) the amount of data transferred during the access at the predetermined rate by the first master.

With the integrated circuit described above, when the first master is executing access at a predetermined rate or above while access requests from a plurality of masters are being controlled, an access request signal of the second master is given priority to access the shared memory. Therefore, in a case that the second master is a processor in which a certain degree of responsiveness is required, the responsiveness of the second master can be improved.

Furthermore, an access control method that controls access of a plurality of masters to a shared memory, the access control method may comprise: a first access control step for causing a first master to access the shared memory, by securing a first access resource to guarantee the access of the first access control unit at a predetermined rate, and when a second access resource is available, cause the first master to access the shared memory at the predetermined rate or above, by securing the second access resource in addition to the first access resource; and a second access control step for, when the first access control unit has caused the first master to access the shared memory at the predetermined rate or above, causing a second master to access the shared memory, by securing the first access resource for the second master to access the shared memory. In addition, an upper limit of an amount of data transferred during the access by the second access control unit using the first access resource is set at a difference between (i) a total of an amount of data transferred during the access at the predetermined rate by the first master and an amount of data transferred during the access at more than the predetermined rate by the first master, and, (ii) the amount of data transferred during the access at the predetermined rate by the first master.

With the above-described method, among a plurality of masters, an access of a master that requires a high responsiveness can be executed, if other masters have executed accesses, which were supposed to be executed at a predetermined rate, by exceeding the predetermined rate. Therefore, the access execution of the master who requires a high responsiveness can be timed without delay.

BRIEF DESCRIPTION OF THE DRAWINGS

FIG. 2A is a timing chart showing the timing of access in conventional technology, and FIG. 2B is a timing chart showing the timing of access in the present invention.

DETAILED DESCRIPTION OF THE INVENTION

The following describes an access control device according to one embodiment of the present invention, with reference to diagrams.

<Overview>

Figure 1:
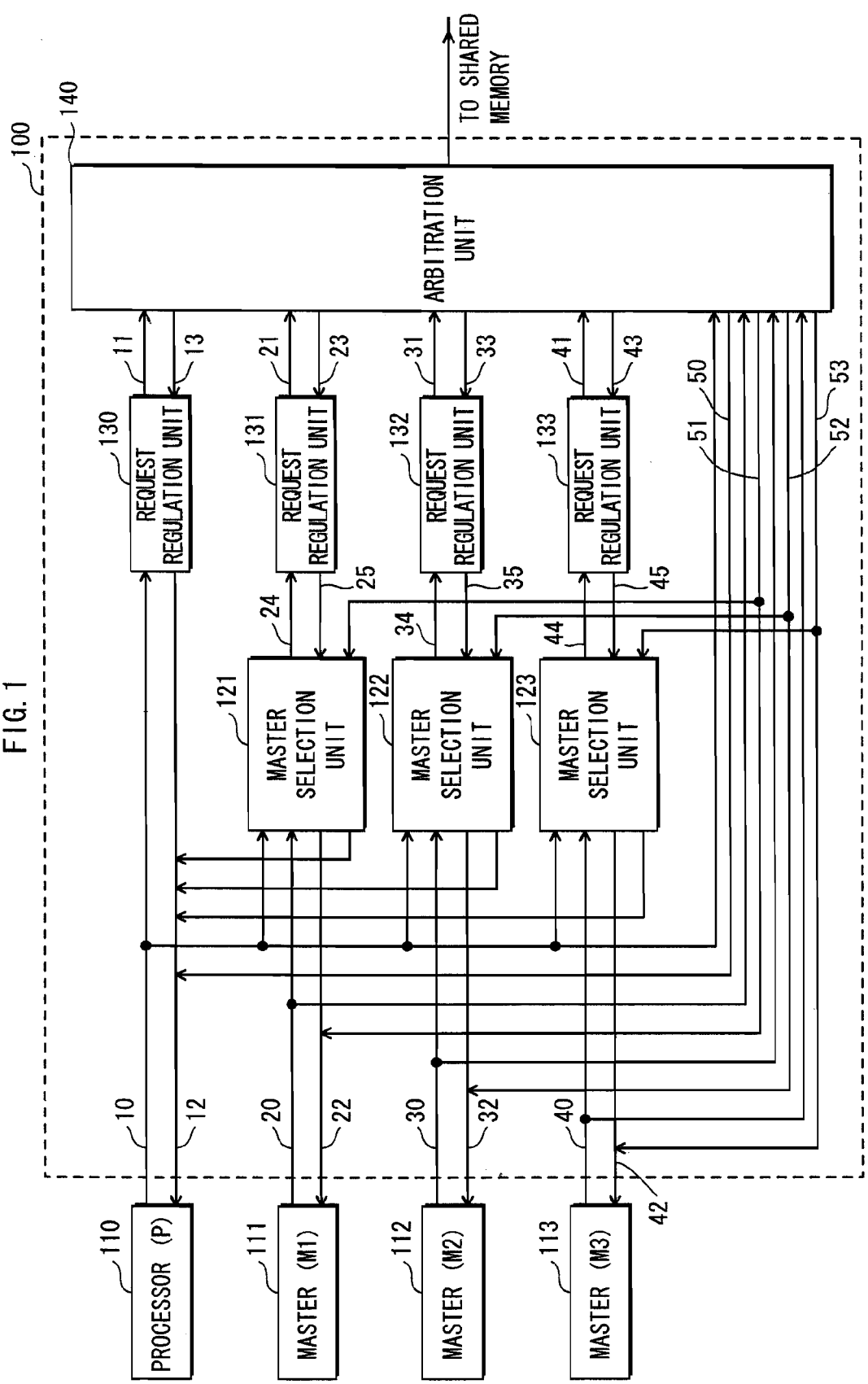
FIG. 1 is a functional block diagram showing the functional structure of an access control device 100 according to the present invention.

As shown in FIG. 1, when a plurality of access devices access a shared memory, a device to arbitrate an access conflict is used to prevent any conflicts.

In FIG. 1, a processor is an access device whose occurrence of an access request to the shared memory is difficult to predict. On the other hand, a master is an access device in which, during an access-guaranteed period, access to the shared memory at a predetermined rate is required to be guaranteed. Specifically, for example, in a BD (Blue-ray Disc) player, a processor responds to a remote control operated by a user, and a master decodes moving images.

In such a case where a plurality of access devices access a shared memory, conventionally, as shown in FIG. 2A, controlling access by allocating, to each of the masters, a time slot in which the master executes access, has been one method for preventing the access conflict. It can be seen from FIG. 2A that a period between the times T0 and T4 is an access-guaranteed period TC, and a processor (P), a master (M1), a master (M2), and a master (M3) sequentially execute access.

However, a rate allocated to each of the masters is set with a certain margin. Therefore, the access is not always executed by using all of the time slots that are guaranteed during the access-guaranteed period. For example, as shown between the times T7 and T8 in the access-guaranteed period TC, which is indicated by the times T4 to T9, the time slot for the M2 to access the shared memory has a blank period since the M2 has no access request, resulting in wasting the blank period.

Therefore, in the present invention, as shown in FIG. 2B, if an access request occurs when the resource for access is available during the access-guaranteed period TC, the master executes access at a predetermined rate or above. In this way, the operation of the access executed at the predetermined rate secures a margin. As shown in FIG. 2B, between the times T7 and T8, the access of M1, which is supposed to be executed between the times T10 and T13 in principle, is executed in advance. Accordingly, after the time T9, M1 has a margin for access. Then, by transmitting an access request from the processor, with use of the resource for the access at the predetermined rate, during the access-guaranteed period of the M1, responsiveness to the access request from the processor is improved.

Here, in FIG. 2B, among accesses that are supposed to be executed after the T9 in principle, an access to be executed in advance is handled by the M1. However, it does not always need to be the M1. It may be the M2 or the M3 as long as the master has an access request. Also, in FIG. 2B, to make the comparison with the conventional technologies easier, the access of the M1 that was supposed to be executed between the times T10 and T13 is executed between the times T7 and T8. However, after T6, the access of the M2 is normally executed first. Then, the access of the M3 is executed. Finally, the access of the M1 that was supposed to be executed between the times T10 and T13 is executed.

<First Embodiment>

<Structure>

FIG. 1 is a functional block diagram showing the functional structure of an access control device according to the present invention.

As shown in FIG. 1, an access control device 100 controls access to a shared memory. The access is executed by a processor 110 (which can be considered a master), a master 111, a master 112, and a master 113. The access control device 100 includes master selection units 121, 122, and 123, request regulation units 130, 131, 132, and 133, and an arbitration unit 140.

The above-described first master corresponds to each of the master 111, the master 112, and the master 113. The above-described second master corresponds to the processor 110.

Given that the first master is the master 111, in a first access control unit, the request regulation unit 131 secures a resource for access at a predetermined rate. In a case that access is executed at a predetermined rate or above, the access is not transmitted to the request regulation unit 131. Instead, the access is realized by an access permission for an access request that is directly output from the master 111 to the arbitration unit 140. The second access control unit is realized by the combination of the master selection unit 121, the request regulation unit 131, and the arbitration unit 140. Also, in a case that the first master is the master 111, the above-described advance access count unit is realized by the master selection unit 121.

The processor 110 is a device whose access request to the shared memory occurs irregularly. As shown in FIG. 1, the processor 110 is connected to each part of the access control device 100 via signal lines 10 and 12.

The master 111 is required to be guaranteed access at a predetermined rate in a certain access-guaranteed period TC. In other words, the master 111 is an access device whose access to the shared memory is required to be executed at a predetermined period, and connected to the master selection unit 121, and the arbitration unit 140 via signal lines 20 and 22.

The master 112 is required to be guaranteed access at a predetermined rate in a certain access-guaranteed period TC. In other words, the master 112 is an access device whose access to the shared memory is required to be executed at a predetermined period, and connected to the master selection unit 122, and the arbitration unit 140 via signal lines 30 and 32.

The master 113 is required to be guaranteed access at a predetermined rate in a certain access-guaranteed period TC. In other words, the master 113 is an access device whose access to the shared memory is required to be executed at a predetermined period, and connected to the master selection unit 123, and the arbitration unit 140 via signal lines 40 and 42.

Here, the access-guaranteed period TC is individually set according to each master. However, in the present embodiment, descriptions are provided with an example of a case in which the access-guaranteed periods TC of all the masters are assumed to be 10 clocks for simplicity.

The master selection unit 121 is connected to the processor 110, the request regulation unit 131, and the arbitration unit 140. In a case of receiving an access request from the master 111, and an access request from the processor 110, the master selection unit 121 selects which access request to send to the request regulation unit 131, and sends, on line 24, the selected request to the request regulation unit 131. Specifically, the master selection unit 121 has a function that counts 10 clocks, which constitute the access-guaranteed period set for the master 111. Also, the master selection unit 121 has a function (hereinafter referred to as access counter) that counts the number of permitted accesses that have passed through the request regulation unit 131, according to an access permission signal 23 received from the arbitration unit 140. Furthermore, the master selection unit 121 has a function (hereinafter referred to as advance access counter) that counts the number of permitted accesses that have not passed through the request regulation unit 131, according to an access permission signal 51 received from the arbitration unit 140. When the advance access counter is 1 or more, and the total of the advance access counter and the access counter reaches the same number as the number of accesses that is necessary to be secured in the access-guaranteed period of the master 111, the master selection unit 121 stops receiving an access request from the master 111, so that the master selection unit 121 can accept an access request from the processor 110 anytime. In a case of receiving an access request from the processor 110, the master selection unit 121 outputs, to the request regulation unit 131, the access request (on line 24) from the processor 110 instead of an access request from the master 111. Furthermore, the master selection unit 121 has a function that decrements the advance access counter by 1 upon receipt of an access permission signal to the processor 110, from the arbitration unit 140 via the request regulation unit 131. Furthermore, every time 10 clocks that constitute the access-guaranteed period elapse, the master selection unit 121 decrements, from the advance access counter, a value that is obtained by decrementing a value of the access counter from the number of accesses that is necessary to be secured in the access-guaranteed period of the master 111. At the same time, the master selection unit 121 resets the access counter to zero. Note that, when the advance access counter is a negative number, the access counter is reset to zero.

The master selection unit 122 is connected to the processor 110, the request regulation unit 132, and the arbitration unit 140. In a case of receiving an access request from the master 112, and an access request from the processor 110, the master selection unit 122 selects which access request to send to the request regulation unit 132, and sends, on line 34, the selected request to the request regulation unit 132. Specifically, the master selection unit 122 has a function that counts 10 clocks, which constitute the access-guaranteed period set for the master 112. Also, the master selection unit 122 has a function that counts the access counter according to an access permission signal 33 received from the arbitration unit 140. Furthermore, the master selection unit 122 has a function that counts the advance access counter of the master 112 according to an access permission signal 52 received from the arbitration unit 140. When the advance access counter is 1 or more, and the total of the advance access counter and the access counter reaches the same number as the number of accesses that is necessary to be secured in the access-guaranteed period of the master 112, the master selection unit 122 stops receiving an access request from the master 112, so that the master selection unit 122 can accept an access request from the processor 110 anytime. In a case of receiving an access request from the processor 110, the master selection unit 122 outputs, to the request regulation unit 132, the access request (on line 34) from the processor 110 instead of an access request from the master 112. Furthermore, the master selection unit 122 has a function that decrements the advance access counter by 1 upon receipt of an access permission signal 35 to the processor 110, from the arbitration unit 140 via the request regulation unit 132. Furthermore, every time 10 clocks that constitute the access-guaranteed period elapse, the master selection unit 122 decrements, from the advance access counter, a value that is obtained by decrementing a value of the access counter from the number of accesses that is necessary to be secured in the access-guaranteed period of the master 112. At the same time, the master selection unit 122 resets the access counter to zero. Note that, when the advance access counter is a negative number, the access counter is reset to zero.

The master selection unit 123 is connected to the processor 110, the request regulation unit 133, and the arbitration unit 140. In a case of receiving an access request from the master 113, and an access request from the processor 110, the master selection unit 123 selects which access request to send to the request regulation unit 133, and sends, on line 44, the selected request to the request regulation unit 133. Specifically, the master selection unit 123 has a function that counts 10 clocks, which constitute the access-guaranteed period set for the master 113. Also, the master selection unit 123 has a function that counts the access counter according to an access permission signal 43 received from the arbitration unit 140. Furthermore, the master selection unit 123 has a function that counts the advance access counter of the master 113 according to an access permission signal 53 received from the arbitration unit 140. When the advance access counter is 1 or more, and the total of the advance access counter and the access counter reaches the same number as the number of accesses that is necessary to be secured in the access-guaranteed period of the master 113, the master selection unit 123 stops receiving an access request from the master 113, so that the master selection unit 123 can accept an access request from the processor 110 anytime. In a case of receiving an access request from the processor 110, the master selection unit 123 outputs, to the request regulation unit 133, the access request (on line 44) from the processor 110 instead of an access request from the master 113. Furthermore, the master selection unit 123 has a function that decrements the advance access counter by 1 upon receipt of an access permission signal 45 to the processor 110, from the arbitration unit 140 via the request regulation unit 133. Furthermore, every time 10 clocks that constitute the access-guaranteed period elapse, the master selection unit 123 decrements, from the advance access counter, a value that is obtained by decrementing a value of the access counter from the number of accesses that is necessary to be secured in the access-guaranteed period of the master 113. At the same time, the master selection unit 123 resets the access counter to zero. Note that, in a case that the advance access counter is a negative number, the access counter is reset to zero.

The request regulation unit 130 stores the number of accesses that is necessary to be secured in the access-guaranteed period of the processor 110. Based on whether the number of accesses has exceeded the actual number of accesses, the request regulation unit 130 judges whether to send an access request from the processor 110 to the arbitration unit 140. When judging affirmatively, the request regulation unit 130 sends the access request to the arbitration unit 140. Here, the request regulation unit 130 sends the access request with a ratio of 1 clock in every 10 clocks. When the timing is different from the above-described ratio, the request regulation unit 130 masks the access request, in other words, does not output the access request to the arbitration unit 140. Note that, in the present embodiment, the processor executes access with a ratio of 1 clock in every 10 clocks. However, as for an access request from the processor, an access-guaranteed period does not specially need to be set, and the request regulation unit 130 may always mask the access request from the processor. In such a case, a resource that remains after excluding all the resources in the access guaranteed period required by other masters is allocated to the processor.

The request regulation unit 131 stores the number of accesses that is necessary to be secured in the access-guaranteed period of the master 111. Based on whether the number of accesses has been exceeded by the actual number of accesses, the request regulation unit 131 judges whether to send an access request from the master 111 to the arbitration unit 140. When judging affirmatively, the request regulation unit 131 sends the access request to the arbitration unit 140. Here, the request regulation unit 131 manages one access-guaranteed period as 10 clocks, and outputs access requests from the master 111, the requests being for the shared memory, until receiving, from the arbitration unit 140, an access permission signal 3 times within 10 clocks. After that, the request regulation unit 131 masks any access requests that are sent within the 10 clocks, in other words, does not send any access requests to the arbitration unit 140 within the 10 clocks. The request regulation unit 131 counts the number of access permission signals 23 from the arbitration unit 140, which are sent in response to the access requests that have been output by the request regulation unit 131. Based on the number that is counted, the request regulation unit 131 executes the above-described judgment. Furthermore, the request regulation unit 131 has a function that outputs the access permission signal 23 from the arbitration unit 140 to the master selection unit 121. Here, the access permission signal is for either the processor 110, or the master 111.

The request regulation unit 132 stores the number of accesses that is necessary to be secured in the access-guaranteed period of the master 112. Based on whether the number of accesses has been exceeded by the actual number of accesses, the request regulation unit 132 judges whether to send an access request from the master 112 to the arbitration unit 140. When judging affirmatively, the request regulation unit 132 sends the access request to the arbitration unit 140. Here, the request regulation unit 132 outputs access requests from the master 112, the requests being for the shared memory, until receiving, from the arbitration unit 140, an access permission signal 3 times within 10 clocks. After that, the request regulation unit 132 masks any access requests that are sent within the 10 clocks, in other words, does not send any access requests to the arbitration unit 140 within the 10 clocks. The request regulation unit 132 counts the number of access permission signals 33 from the arbitration unit 140, which are sent in response to the access requests that have been output by the request regulation unit 132. Based on the number that is counted, the request regulation unit 132 executes the above-described judgment. Furthermore, the request regulation unit 132 has a function that outputs the access permission signal 33 from the arbitration unit 140 to the master selection unit 122. Here, the access permission signal is for either the processor 110, or the master 112.

The request regulation unit 133 stores the number of accesses that is necessary to be secured in the access-guaranteed period of the master 113. Based on whether the number of accesses has been exceeded by the actual number of accesses, the request regulation unit 133 judges whether to send an access request from the master 113 to the arbitration unit 140. When judging affirmatively, the request regulation unit 133 sends the access request to the arbitration unit 140. Here, the request regulation unit 133 outputs access requests from the master 113, the requests being for the shared memory, until receiving, from the arbitration unit 140, an access permission signal 3 times within 10 clocks. After that, the request regulation unit 133 masks any access requests that are sent within the 10 clocks, in other words, does not send any access requests to the arbitration unit 140 within the 10 clocks. The request regulation unit 133 counts the number of access permission signals 43 from the arbitration unit 140, which are sent in response to the access requests that have been output by the request regulation unit 133. Based on the number that is counted, the request regulation unit 133 executes the above-described judgment. Furthermore, the request regulation unit 133 has a function that outputs the access permission signal 43 from the arbitration unit 140 to the master selection unit 123. Here, the access permission signal is for either the processor 110, or the master 113.

Figure 3:
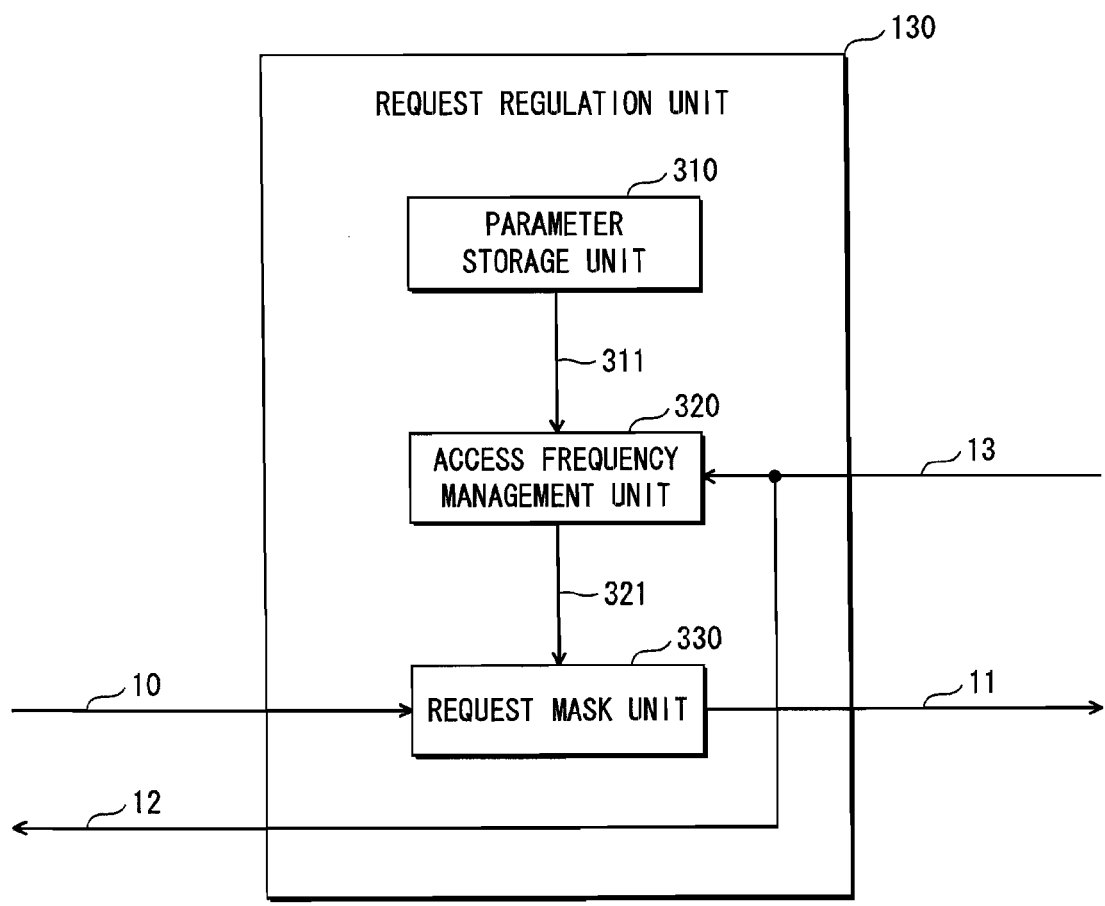
FIG. 3 is a functional block diagram showing the functional structure of a request regulation unit 130.

FIG. 3 shows a more detailed block diagram of the request regulation unit. The following describes the request regulation unit 130, and the descriptions of the rest of the other request regulation units are substantially the same, and therefore are omitted.

As shown in FIG. 3, the request regulation unit 130 includes a parameter storage unit 310, an access frequency management unit 320, and a request mask unit 330.

The parameter storage unit 310 stores a value of an access-guaranteed period that determines a guaranteed rate of each master, and the number of accesses that is necessary to be secured in the access-guaranteed period. The parameter storage unit 310 outputs these parameters to the access frequency management unit 320 via a signal line 311. Here, the number of accesses that is necessary to be secured in the access-guaranteed period is 1, and the parameter of the access-guaranteed period is 10.

The access frequency management unit 320 has a function that counts the number of times an access has been executed via the request regulation unit 130. Specifically, for each access permission signal received from the arbitration unit 140 via a signal line 13, the access frequency management unit 320 adds 1 to the access counter. Then, upon receipt of an access request signal via a signal line 10, if the access counter is 3 or more, the access frequency management unit 320 informs the request mask unit 330 that the access cannot be permitted, by setting the potential of a signal line 321 to a High-level. Also, the access frequency management unit 320 counts 10 clocks that constitute the access-guaranteed period. Every time 10 clocks elapse, the access frequency management unit 320 resets the access counter to zero.

The request mask unit 330 has a function that outputs an access request to the arbitration unit 140, based on a received mask signal, from the access frequency management unit 320 via the signal line 321. Specifically, when the potential of the signal line 321 is at a Low-level, the request mask unit 330 outputs an access request signal from the processor 110, which is received via the signal line 10, directly to the arbitration unit 140. When the potential of the signal line 321 is at a High-level, the request mask unit 330 does not output the access request signal to the arbitration unit 140.

The arbitration unit 140 has a function that arbitrates, based on a predetermined standard, the order of executing the accesses, upon receipt of access requests to the shared memory from the access devices, namely the processor 110 and the masters 111, 112, 113. In principle, the arbitration unit 140 permits access in order of the received access requests from the signal lines 11, 21, 31, 41, 10, 20, 30, and 40 in the stated order. When receiving a higher access request, the arbitration unit 140 puts a lower access request on hold. Also, the arbitration unit 140 has a function that outputs, to the processor or one of the masters whose access request is to be permitted, an access permission signal indicating that the access is permitted. Note that, when receiving an access request that has been output from one of the request regulation units, the arbitration unit 140 outputs an access permission signal to the request regulation unit. When receiving an access request that has not been output from any one of the request regulation units, the arbitration unit 140 outputs an access permission signal directly to the processor or one of the masters using a corresponding signal line selected from signal lines 50 to 53. Furthermore, as for an access request that does not pass through any request regulation units, when outputting an access permission signal with respect to an access request from one of the masters, the arbitration unit 140 also outputs an access permission signal to a master selection unit that corresponds to the master.

The above has completed the descriptions of the functions of the parts of the access control device 100.

<Operation>

Figure 4:
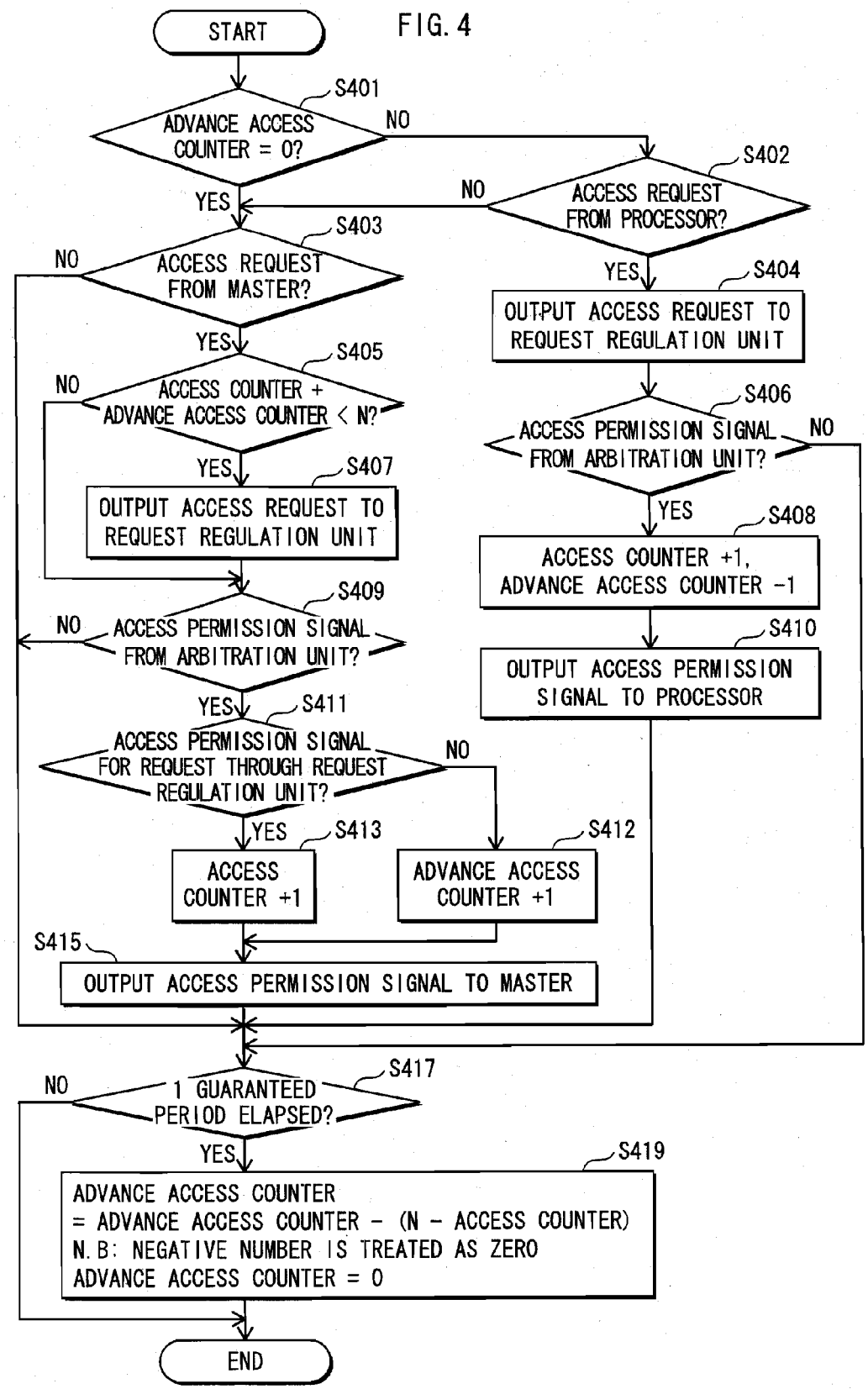
FIG. 4 is a flow chart showing the operation of a master selection unit during an access-guaranteed period.

The following describes the operation of the master selection units in the access control device of the present embodiment, with reference to the flow chart shown in FIG. 4. The operation of the master selection units described here is an operation performed in one clock. Here, the master selection unit 121 is used as an example to describe the operation. The other master selection units execute substantially the same operation as the master selection unit 121. Therefore, the descriptions thereof are omitted.

First, the master selection unit 121 judges whether or not the advance access counter, which is counted by the master selection unit 121, indicates zero (step S401). Note that the initial value of the advance access counter is zero. When the advance access counter is zero ("YES" in step S401), the master selection unit 121 judges whether or not the master 111 has an access request, by judging whether or not the master selection unit 121 has received an input from a signal line 20 (step S403). When the master 111 does not have any access requests ("NO" in step S403), the master selection unit 121 executes the process of step S417, and the rest of the process that follows. When the master 111 has an access request ("YES" in step S403), the master selection unit 121 judges whether or not the total of values indicated by the access counter and the advance access counter is less than N (step S405). Here, N represents the number of accesses that is necessary to be secured in the access-guaranteed period of each of the masters. In the present embodiment, N is set to be 3. When the total of values indicated by the access counter and the advance access counter is less than N ("YES" in step S405), the master selection unit 121 outputs, to the request regulation unit 131, an access request of the master 111 (step S407). When the total of values indicated by the access counter and the advance access counter is not less than N ("NO" in step S405), the master selection unit 121 executes the process of step S409, and the rest of the process that follows.

The master selection unit 121 judges whether or not the master selection unit 121 has received, from the arbitration unit 140, an access permission signal indicating an access permission (step S409). Here, the master selection unit 121 receives the access permission signal via a signal 25 or a signal 51. When not having received the access permission signal from the arbitration unit 140 ("NO" in step S409), the master selection unit 121 executes the process of step S417, and the rest of the process that follows. When having received the access permission signal ("YES" in step S409), the master selection unit 121 judges whether or not the received access permission signal has been sent via the request regulation unit 131 (step S411). This is judged based on whether or not the master selection unit 121 has received the access permission signal via a signal line 23. When the received access permission signal has been sent via the request regulation unit 131 ("YES" in step S411), the master selection unit 121 adds 1 to the access counter, which is counted by the master selection unit 121 (step S413). Meanwhile, in step S409, when the access permission signal received by the master selection unit 121 has not been sent via the request regulation unit 131 ("NO" in step S411), namely, the access permission signal has been sent via a signal line 51, the master selection unit 121 adds 1 to the advance access counter (step S412), and outputs the access permission signal to the master 111 (step S415).

When the advance access counter is not zero ("NO" in step S401), the master selection unit 121 judges whether or not the master selection unit 121 has received an access request signal from the processor 110 via the signal line 10 (step S402). When not having received an access request from the processor 110 ("NO" in step S402), the master selection unit 121 executes the process of step S403, and the rest of the process that follows. When having received an access request from the processor 110 ("YES" in step S402), the master selection unit 121 outputs the access request signal to the request regulation unit 131 (step S404). The master selection unit 121 judges whether or not the master selection unit 121 has received the access permission signal 23 from the arbitration unit 140 (step S406). When not having received the access permission signal 23 ("NO" in step 406), the master selection unit 121 executes the process of step S417, and the rest of the process that follows. When having received the access permission signal from the arbitration unit 140 ("YES" in step S406), the master selection unit 121 adds 1 to a value of the access counter, and decrements the advance access counter by 1 (step S408). Then, the master selection unit 121 outputs an access permission signal to the processor 110 (step S410).

Then, the master selection unit 121 judges whether or not a value indicated by an access-guaranteed-period timer (hereinafter referred to as guaranteed-period timer), which is counted by a clock counter in the master selection unit 121, has reached 10 (step S417). When the access-guaranteed period has not elapsed, namely the guaranteed-period timer indicates a value less than 10 ("NO" in step S417), the master selection unit 121 ends the operation performed in one clock. When the access-guaranteed period has elapsed, namely the guaranteed-period timer indicates a value 10 ("YES" in step S417), the master selection unit 121 resets the guaranteed-period timer and the access counter to zero. Also, the master selection unit 121 updates the counter of the advance access counter. The updated value is obtained by subtracting, from the advance access counter at the time, a difference between N and a value indicated by the access counter. The above-described N is the number of times the access of the master 111 is permitted. Note that, in a case that the advance access counter is a negative number as a result of the above-described calculation, the advance access counter is updated with zero (step S419). The above-described process completes the operation performed in one clock.

Note that, the access-guaranteed period, and the numbers of accesses that is necessary to be secured in the access-guaranteed period (N), which are both used in each of the master selection units, are set based on parameters. The parameters are stored in the parameter storage unit of a different request regulation unit, to which each of the master selection units is connected.

Figure 5:
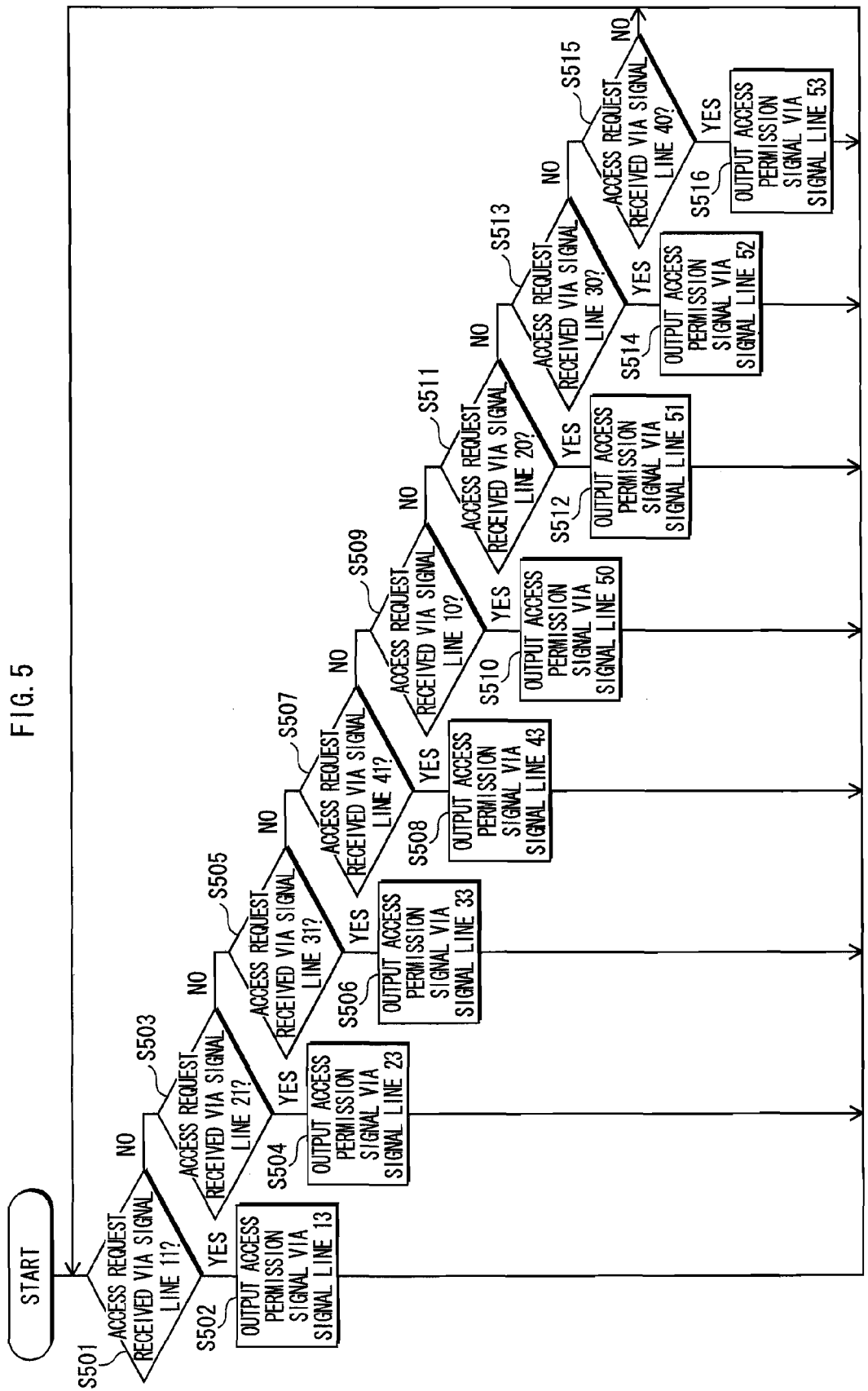
FIG. 5 is a flow chart showing an operation pertaining to an access request of an arbitration unit 140.

The following describes the operation of the arbitration unit 140, with reference to FIG. 5. As shown in FIG. 5, upon receipt of an access request, the arbitration unit 140 judges whether or not the access request has been received via a signal line 11 (step S501). When judging affirmatively ("YES" in step S501), the arbitration unit 140 outputs, to the signal line 13, an access permission signal for the processor 110 (step S502). Then, the process starts again from step S501.

When not having received the access request via the signal line 11 ("NO" in step S501), the arbitration unit 140 judges whether or not the access request has been received via a signal line 21 (step S503). When judging affirmatively ("YES" in step S503), the arbitration unit 140 outputs, to the signal line 23, an access permission signal for the master 111 (step S504). Then, the process starts again from step S501.

When not having received the access request via the signal line 21 ("NO" in step S503), the arbitration unit 140 judges whether or not the access request has been received via a signal line 31 (step S505). When judging affirmatively ("YES" in step S505), the arbitration unit 140 outputs, to the signal line 33, an access permission signal for the master 112 (step S506). Then, the process starts again from step S501.

When not having received the access request via the signal line 31 ("NO" in step S505), the arbitration unit 140 judges whether or not the access request has been received via a signal line 41 (step S507). When judging affirmatively ("YES" in step S507), the arbitration unit 140 outputs, to a signal line 43, an access permission signal for the master 113 (step S508). Then, the process starts again from step S501.

When not having received the access request via the signal line 41 ("NO" in step S507), the arbitration unit 140 judges whether or not the access request has been received via the signal line 10 (step S509). When judging affirmatively ("YES" in step S509), the arbitration unit 140 outputs, to a signal line 50, an access permission signal for the processor 110 (step S510). Then, the process starts again from step S501.

When not having received the access request via the signal line 10 ("NO" in step S509), the arbitration unit 140 judges whether or not the access request has been received via the signal line 20 (step S511). When judging affirmatively ("YES" in step S511), the arbitration unit 140 outputs, to the signal line 51, an access permission signal for the master 111 (step S512). Then, the process starts again from step S501.

When not having received the access request via the signal line 20 ("NO" in step S511), the arbitration unit 140 judges whether or not the access request has been received via a signal line 30 (step S513). When judging affirmatively ("YES" in step S513), the arbitration unit 140 outputs, to a signal line 52, an access permission signal for the master 112 (step S514). Then, the process starts again from step S501.

When not having received the access request via the signal line 30 ("NO" in step S513), the arbitration unit 140 judges whether or not the access request has been received via a signal line 40 (step S515). When judging affirmatively ("YES" in step S515), the arbitration unit 140 outputs, to a signal line 53, an access permission signal for the master 113 (step S516). Then, the process starts again from step S501.

The above completes the operation of the arbitration unit 140.

Figure 6:
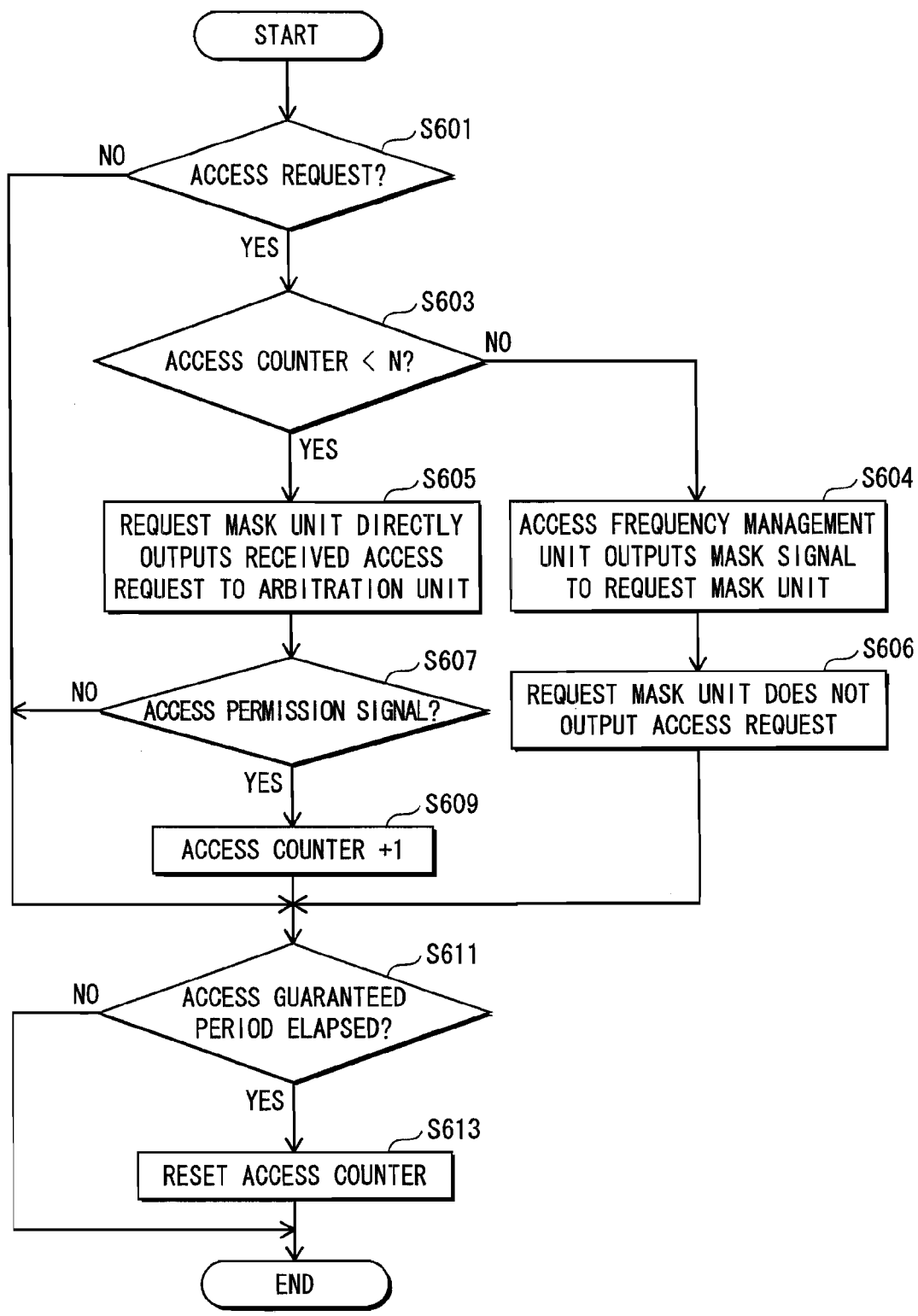
FIG. 6 is a flow chart showing an operation of the request regulation unit upon receipt of an access request.

The following describes the operation of each of the request regulation units, with reference to FIG. 6.

The request regulation unit judges, for each clock, whether or not the request regulation unit has received an access request from the processor or one of the masters (step S601). When judging negatively ("NO" in step S601), the request regulation unit executes the process of step S611, and the rest of the process that follows. When judging affirmatively ("YES" in step S601), the access frequency management unit that has received the access request judges whether or not the access counter, which is stored in the access frequency management unit, indicates a value less than N (step S603). Here, N is stored by the parameter storage unit of the request regulation unit, and represents the number of accesses required by the processor or one of the masters within the access-guaranteed period. When the access counter is less than N ("YES" in step S603), the access frequency management unit does not output a mask signal. Therefore, the request mask unit outputs a received access request signal directly to the arbitration unit 140 (step S605).

The request regulation unit judges whether or not the request regulation unit has received, from the arbitration unit 140, an access permission signal, which indicates an access permission to the access request signal that has been output (step S607). When judging negatively ("NO" in step S607), the request regulation unit executes the process of step S611, and the rest of the process that follows. When judging affirmatively ("YES" in step S607), the access frequency management unit of the request regulation unit adds 1 to the access counter (step S609). Then, the request regulation unit outputs, to the master selection unit, the access permission signal that has been received from the arbitration unit 140.

Subsequently, the request regulation unit judges whether or not the access-guaranteed period has elapsed, namely whether or not the counter of the access-guaranteed period is 10 (S611). When the count of the access-guaranteed period has not reached 10 ("NO" in step S611), the request regulation unit ends the operation performed in one clock. When the count of the access-guaranteed period has reached 10 ("YES" in step S611), the request regulation unit resets the access counter to zero (step S613), and ends the operation performed in one clock.

Meanwhile, when the access counter is N ("NO" in step S603), the access frequency management unit outputs a mask signal to the request mask unit (step S604). The request mask unit that has received the mask signal does not output an access request signal to the arbitration unit 140 (step S606), and ends the process of and after the step S611.

The above-described process completes the operation of the request regulation unit, which is performed in one clock.

Figure 7:
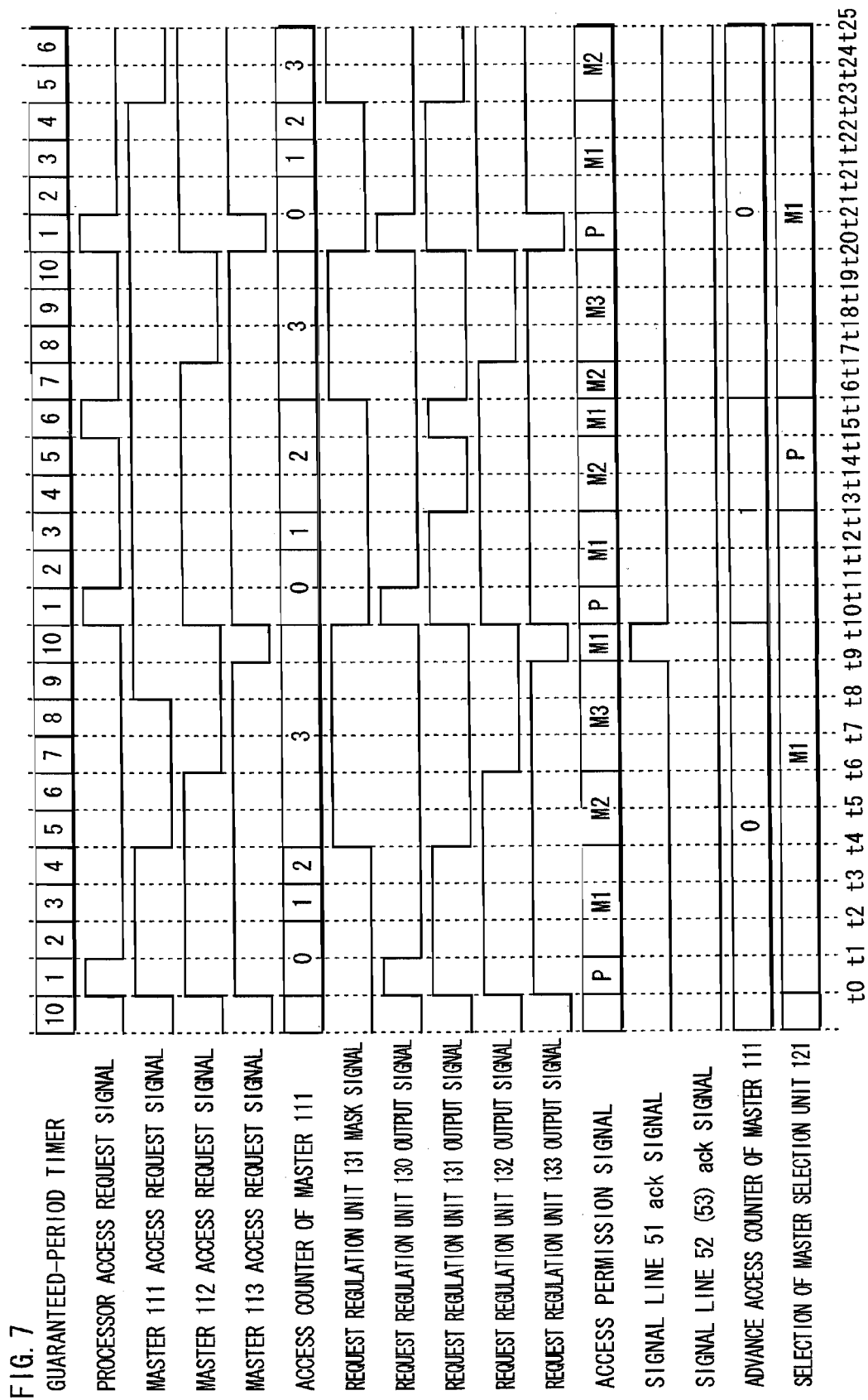
FIG. 7 is a timing chart showing a specific example of a state of data transmitted through signal lines during access according to the first embodiment.

The following describes states of signals in the access control device 100, with reference to the timing chart shown in FIG. 7. The timing chart in FIG. 7 shows states of signals that are transmitted through the signal lines, the values of the timer count and such, when the characteristics of the present invention can be seen. Each of the states of the signals shown in FIG. 7 is one specific example.

A signal in the first line in FIG. 7 shows the timer count of the access-guaranteed period, which is counted by each of the request regulation units and each of the master selection units. Shown in the second line is an access request signal indicating an access request from the processor 110. Shown in the third line is an access request signal indicating an access request from the master 111. Shown in the fourth line is an access request signal indicating an access request from the master 112. Shown in the fifth line is an access request signal indicating an access request from the master 113. Shown in the sixth line is the access counter that is counted by the master selection unit 121 and the request regulation unit 131. Shown in the seventh line is a mask signal that is output by the access frequency management unit of the request regulation unit 131. Shown in the eighth line is an access request signal to be output to the arbitration unit 140 when the request regulation unit 130 has received an access request. Shown in the ninth line is an access request signal to be output to the arbitration unit 140 when the request regulation unit 131 has received an access request. Shown in the tenth line is an access request signal to be output to the arbitration unit 140 when the request regulation unit 132 has received an access request. Shown in the eleventh line is an access request signal to be output to the arbitration unit 140 when the request regulation unit 133 has received an access request. Shown in the twelfth line is an output destination of an access permission signal that is output by the arbitration unit 140. Here, it is shown, for each timing, which processor or master the arbitration unit 140 outputs the signal to. Shown in the thirteenth line is an ack signal indicating an access permission that the arbitration unit 140 sends, via the signal line 51, to the master 111 and the master selection unit 121. Shown in the fourteenth line is an ack signal indicating an access permission that the arbitration unit 140 sends, via the signal line 52, to the master 112 and the master selection unit 122. Note that the ack signal shown in the fourteenth line is also an ack signal indicating an access permission that the arbitration unit 140 sends, via the signal line 53, to the master 113 and the master selection unit 123. Shown in the fifteenth line is a value of the advance access counter that is counted by the master selection unit 121. Finally, shown in the sixteenth line is about which access request is prioritized by the master selection unit 121, the processor 110 or the master 111.

At the time t0, each of the processor 110 and the masters 111-113 outputs a different access request signal. Upon receipt of an access request signal from the processor 110, the request regulation unit 130, as seen in the output signal of the request regulation unit 130 in FIG. 7, outputs the access request signal to the arbitration unit 140 during the time period between t0 and t1. In the same manner, upon receipt of an access request from the master 111, the request regulation unit 131 outputs, as seen in the output signal of the request regulation unit 131, the access request signal to the arbitration unit 140 during the time period between t0 and t4. Upon receipt of an access request from the master 112, the request regulation unit 132 outputs, as seen in the output signal of the request regulation unit 132, the access request signal to the arbitration unit 140 during the time period between t0 and t6. Upon receipt of an access request from the master 113, the request regulation unit 133 outputs, as seen in the output signal of the request regulation unit 133, the access request signal to the arbitration unit 140 during the time period between t0 and t9.

As shown in FIG. 7, upon receipt of the output signals from the request regulation units, the arbitration unit 140 outputs access permission signals in order of priority that is set therein. The arbitration unit 140 outputs an access permission signal to the processor 110 during the time period between t0-t1, to the master 111 during the time period between t1-t4, to the master 112 during the time period between t4-t6, to the master 113 during the time period between t6-t9. Originally, the master 112 is permitted to execute access for 3 clocks out of 10 clocks of the access-guaranteed period. However, at the point where 2 clocks' worth of access permission signals are output from the arbitration unit 140, in response to an access request from the master 112, and then the master 112 has executed access, the master 112 does not have any more access requests. Therefore, an output signal of the request regulation unit 132 is not output, either. As a result, an access permission signal is output to the master 113 whose priority is the highest next to the master 112. In the time period between t9 and t10, every output signal from the request regulation units of all the masters is Low. This means that a resource to access the shared memory is available for one clock.

Here, an access request signal is output from the master 111, starting from the time t8. However, the master 111 has executed the required access to the shared memory during the time period between t1 and t4. Therefore, the master 111 cannot execute access via the request regulation unit 131. This is realized such that, between the times t8 and t10, the mask signal of the request regulation unit 131 is set to be high, resulting in the request regulation unit 131 not outputting an access request signal to the arbitration unit 140. The access request of the master 111 is output directly to the arbitration unit 140 via the signal line 20, and at this point, the signal lines 11, 21, 31, 41, and 10 do not output access requests. Therefore, the time period between t9 and t10 has a resource available for an access, and, since there are no access requests that are higher than the direct access request of the master 111, the arbitration unit 140 outputs, to the master 111, an ack signal indicating an access permission via the signal line 51. It can be seen from FIG. 7 that the master 111 (M1) is specified as the destination of an access permission signal.

Upon receipt of the ack signal via the signal 51, the master selection unit 121 adds 1 to the advance access counter. As shown in FIG. 7, the advance counter indicates 1 from the time t10. At the time t10, the guaranteed-period timer is reset, and the next access-guaranteed period 1-10 is counted.

The master 111 continues to output an access request signal from the time t8 to the time t23. However, the master selection unit 121 prevents this access request signal from being output to the request regulation unit from the time t13 to the time t20. The time t13 is also a timing when the total value of the access counter of the master 111 and the advance access counter of the master 111 reaches 3, which is the same as the number of times that the master 111 is permitted to access the shared memory during the access-guaranteed period. The master selection unit 121 does not output the access request to the master 111 because of the structure in which, when the value of the advance access counter is 1 or more, and the total value of the access counter and the advance access counter is the same as the number of permitted accesses, the master selection unit 121 does not output the access request of the master 111. This is because the master selection unit 121 prioritizes the access of the processor 110.

Meanwhile, the processor 110 outputs access requests between the times t10 and t11, and between the times t15 and t16. The access request of the processor between the times t10 and t11 is output to the arbitration unit 140 via the request regulation unit 130 as usual. However, the access request between the times t15 and t16, as shown by the output signal of the request regulation unit 130 in the figure, is not output due to the mask.

An access request from the processor 110 is sent to not only the request regulation unit 130, but also each of the master selection units and the arbitration unit 140. Between the times t15 and t16, the advance access counter of the master selection unit 121 indicates 1. In this case, the master selection unit 121 prioritizes the access request from the processor, and outputs the access request to the request regulation unit 131. Since the access counter that is set in the request regulation unit 131 has not reached 3, the request regulation unit 131 outputs the access request of the processor 110, which has been received from the master selection unit 121, to the arbitration unit 140. From the time t10, the request regulation unit 132 outputs an access request of the master 112. Between the times t13 and t15, the arbitration unit 140 outputs an access permission to the master 112. However, at the time t15, the request regulation unit 131, which has a higher access right than the request regulation unit 132, outputs an access request. Therefore, the arbitration unit 140 outputs, via the request regulation unit 131, an access permission signal to the master selection unit 121. Upon receipt of the access permission signal from the arbitration unit 140, the master selection unit 121 outputs, since the processor 110 is selected for the time t15, an access permission signal to the processor 110, and does not output an access permission signal to the master 111. The above-described operation causes the processor to receive an access permission between the times t15-t16.

Upon receipt of the access request from the arbitration unit 140, the request regulation unit 131 adds 1 to the access counter, and the access frequency management unit outputs a mask signal. From then to the time t20, the request regulation unit 131 does not output an access request signal. From the time t16, an access request from the master 112, which is output from the request regulation unit 132, is accepted. Then, the arbitration unit 140 gives an access permission to the master 112. From the time t17, the request regulation units 130, 131, and 132 do not output any access requests. Therefore, it is possible to accept an access request from the master 113, which is output via the request regulation unit 133.

Then, from the time t20, the next access-guaranteed period begins. Note that, descriptions of the actual access from the processor or each of the masters to the shared memory are not particularly provided above. However, each of the processor and the masters executes access upon receipt of the respective access permission signals 12, 22, 32, and 42.

As shown in FIG. 7, the master 111 is originally permitted to execute access only 3 times in 10 clocks that constitute the access-guaranteed period. However, in a case that a resource to access the shared memory is available between the times t9 and t10, the master 111 realizes access that exceeds the originally set rate by using the route on which an access request does not pass through the request regulation unit 131. Here, the access executed by the master 111 between the times t9 and t10 was supposed to be executed during the next access-guaranteed period, which is between t10 and t20. Therefore, a margin can be obtained in the cyclically-performed access operation. With this margin, an access request of the processor 110, which is originally output only once in 10 clocks, is output by the master selection unit 121, as shown in the times between t15 and t16. In response, the request regulation unit 131 outputs the access request from the processor 110 to the arbitration unit 140. Conventionally, an access request from the processor 110 is not accepted between the times t15 and t16, resulting in being put on hold until the time t20. However, in the present invention, instead of an access request from the master 111, the access request from the processor 110 is output via the request regulation unit 131, and receives an access permission from the arbitration unit 140. Therefore, responsiveness to an access request from the processor 110 has improved compared to conventional technologies.

<Second Embodiment>

Second embodiment is different from the first embodiment in terms of the number of request regulation units. In the first embodiment, the number of request regulation units is the same as the total number of the masters and the processor, so that each of the request regulation units corresponds to a different one of the masters or the processor. In the second embodiment, however, one request regulation unit controls all of the plurality of masters and the processor.

<Construction>

Figure 8:
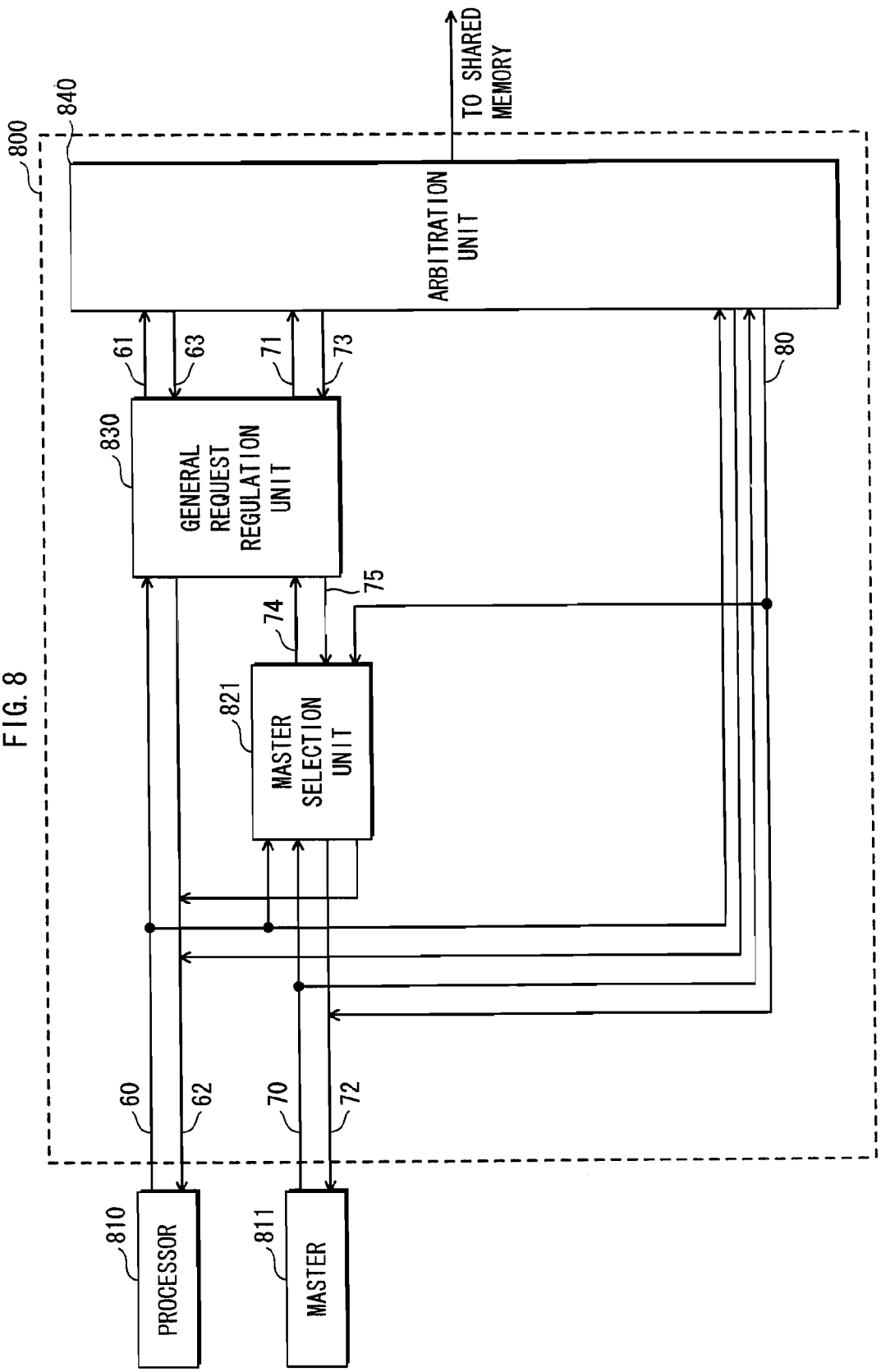
FIG. 8 is a functional block diagram showing the functional structure of an access control device according to the second embodiment.

The following describes an access control device according to the second embodiment, with reference to FIG. 8 that shows a functional block diagram.

As shown in FIG. 8, an access control device 800 includes a master selection unit 821, a general request regulation unit 830, and an arbitration unit 840. A processor 810 is connected to each part of the access control device 800 via signal lines 60 and 62. Also, a master 811 is connected to the access control device 800 via signal lines 70 and 72.

The master selection unit 821 has the same function as the master selection unit 121 in the first embodiment and is connected to the general request regulation unit 830 via lines 74 and 75 and the arbitration unit 840 via line 80. Therefore, the explanation thereof is omitted here. Also, the function of the arbitration unit 840 is substantially the same as the arbitration unit 140 in the first embodiment, even though the number of masters connected to the access control device 800 is different from the number of masters connected to the access control device 100 in the first embodiment. Therefore, the explanation of the arbitration unit 840 is omitted.

Figure 9:
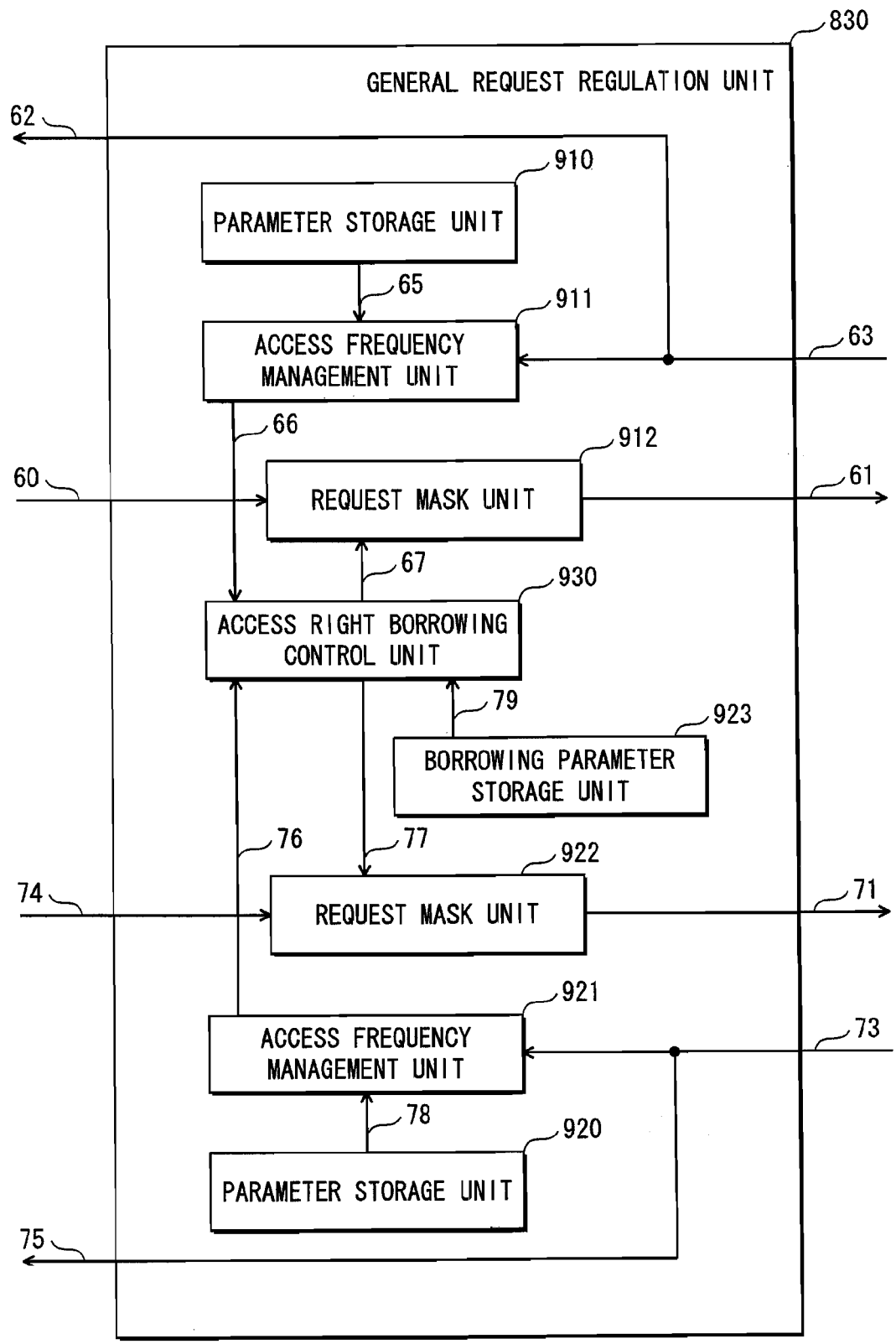
FIG. 9 is a functional block diagram showing the functional structure of a general request regulation unit according to the second embodiment.

The main characteristic of the present embodiment is the general request regulation unit 830. FIG. 9 is a functional block diagram showing the inner construction thereof in detail. As shown in FIG. 9, the general request regulation unit 830 includes a parameter storage unit 910, an access frequency management unit 911, a request mask unit 912, a parameter storage unit 920, an access frequency management unit 921, a request mask unit 922, a borrowing parameter storage unit 923, and an access right borrowing control unit 930. The parts of the general request regulation unit 830 are connected to each other via signal lines 65, 66, 67, 76, 77, 78 and 79, as shown in FIG. 9.

The parameter storage unit 910 has a function to receive information from the processor 810, store the information, and output the information to the access frequency management unit 911. The information includes (i) information indicating the access-guaranteed period of the processor 810, and (ii) permissible access frequency information indicating permissible access frequency in the access-guaranteed period.

The access frequency management unit 911 has a function to count the access counter, based on an access permission signal received from the arbitration unit 840 on line 63, and a function to output, to the access right borrowing control unit 930, the access counter that is counted.

The request mask unit 912 has a function to output, when not having received a mask signal from the access right borrowing control unit 930, an access request signal (on line 61) from the processor 810 directly to the arbitration unit 840, and, to not output the access request signal from the processor 810 to the arbitration unit 840, when having received the mask signal.

The parameter storage unit 920 has a function to receive information from the master 811, store the information, and output the information to the access frequency management unit 921. The information includes (i) information indicating the access-guaranteed period of the master 811, and (ii) permissible access frequency information indicating permissible access frequency in the access-guaranteed period.

The access frequency management unit 921 has a function to count the access counter, based on an access permission signal received from the arbitration unit 840 on line 73, and sent to the master selection unit 821 on line 75, and, to output, to the access right borrowing control unit 930, the access counter that is counted.

The request mask unit 922 has a function to output, when not having received a mask signal from the access right borrowing control unit 930, an access request signal (on line 71) from the master 811 directly to the arbitration unit 840, and, to not output the access request signal from the master 811 to the arbitration unit 840, when having received the mask signal.

The borrowing parameter storage unit 923 has a function to store parameters, and output the parameters to the access right borrowing control unit 930. The parameters are set by a user from outside, and include permissive access frequency information in the access-guaranteed periods of the processor 810 and the master 811, information of a maximum time period in which an access right can be borrowed, and information of a time period between a preceding borrowing of the access right and the subsequent borrowing of the access right.

The access right borrowing control unit 930 has a function to output mask signals to the request mask unit 912 and the request mask unit 922, based on the borrowing parameters received from the borrowing parameter storage unit 923, and the access frequency information received from the access frequency management unit 911, and the access frequency management unit 921. Detailed descriptions of an operation in which the access right borrowing control unit 930 controls the lending and borrowing of an access right are provided below, with reference to FIG. 10 that shows a state transition diagram.

<Operation>

Figure 10:
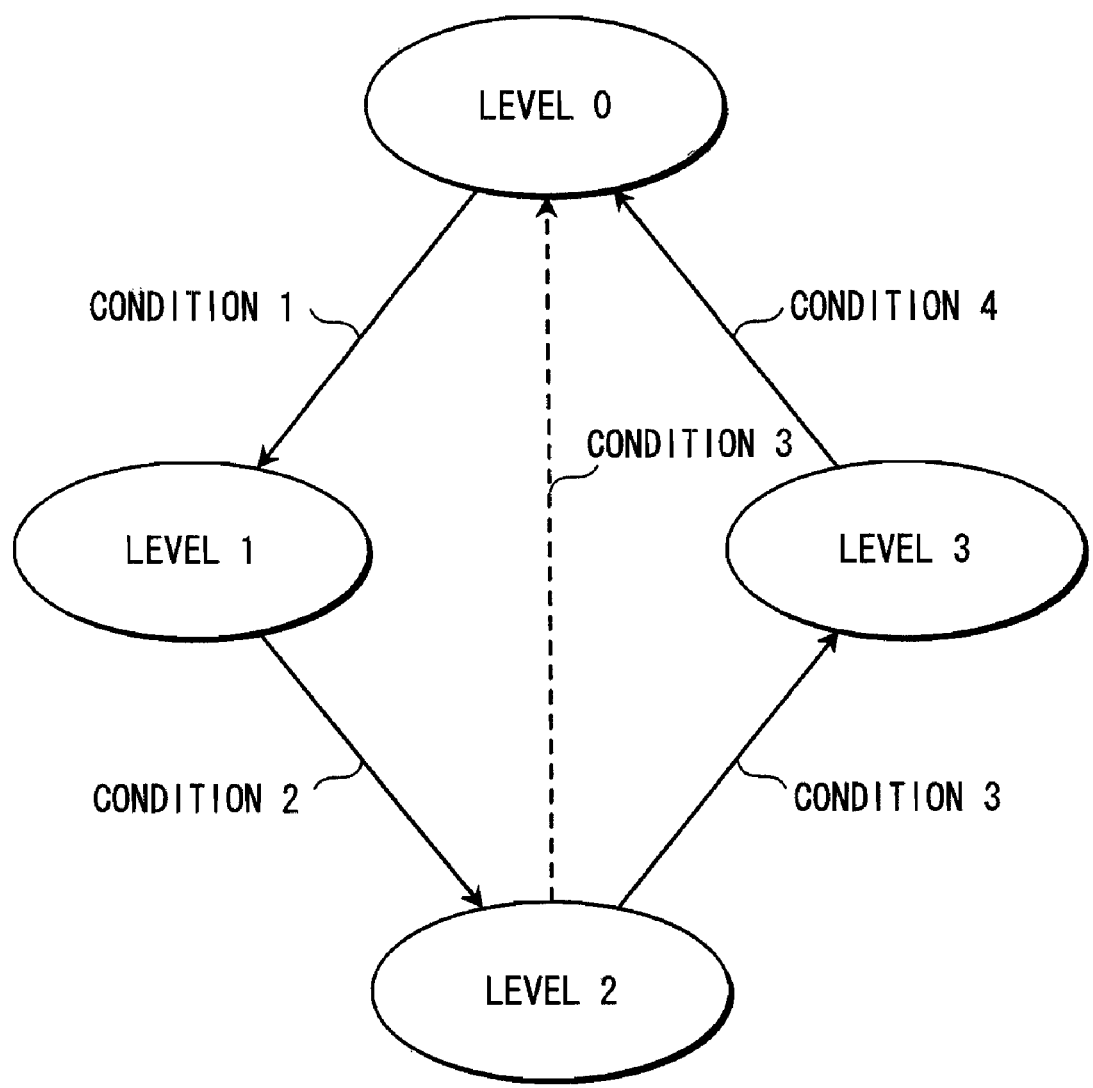
FIG. 10 is a state transition diagram showing a transition of a state of an access right in the request regulation unit.

The following are explanations about the state transition diagram shown in FIG. 10.

First, the states and the transition conditions shown in FIG. 10 are briefly described. Then, an operation of the general request regulation unit 830 is described in line with the state transition diagram.

The access right borrowing control unit 930 has four states from levels 1 to 4, as shown in FIG. 10. The following describes a state of each of the levels.

The level 0 indicates a state in which the access right is not being lent or borrowed, and each of the masters is operating within an access frequency range that is set in advance.

The level 1 indicates a state in which the processor 810 is executing access, with a rate that is higher than a set access frequency of the processor 810, by borrowing an access right from the master 811. When the access right borrowing control unit 930 is in level 1, an access of the master 811 is not executed.

The level 2 indicates a state in which the processor 810 is returning the access right to the master 811 from which the access right has been borrowed. In level 2, the access of the processor 810 is not executed.

The level 3 indicates a state in which the processor 810 has completely returned the borrowed access right to the master 811, and, also a state in which the processor 810 cannot borrow the access right from the master 811, in a case that the processor 810 executes access.

In each of the levels, the following are the conditions when one level is shifted to another.

In a condition 1, which is for a transition from the level 0 to the level 1, the processor 810 is required to execute access more than an access frequency that has been preliminarily set.

The condition 1 is detected based on the access frequency information that is output by the access frequency management unit 911.

In a condition 2, which is for a transition from the level 1 to the level 2, after the processor 810 borrows an access right, the maximum time period, in which the access right can be borrowed, is required to elapse. The access right borrowing control unit 930 detects the elapse of the maximum time period in the condition 2, based on (i) a clock count that is counted by the access right borrowing control unit 930 and (ii) the borrowing parameter that indicates the maximum time period. Here, the clock count is counted by the access right borrowing control unit 930, and the borrowing parameter is stored in the borrowing parameter storage unit 923.

In a condition 3, which is for a transition from the level 2 to the level 3, the processor 810 is required to return the borrowed access right completely. This condition is detected by the access right borrowing control unit 930, based on whether or not the master 811 has executed access equivalent to the time period of the access right, which is borrowed by the processor 810.

In a condition 4, which is for a transition from the level 3 to the level 0, the time period from when the processor 810 borrows an access right to when the processor 810 is permitted to borrow the access right again elapses. The condition 4 is detected such that the access right borrowing control unit 930 counts, with a clock counter, the time period that has been output from the borrowing parameter storage unit 923.

Note that, in the condition 3 shown by a dashed line, a state of the access right borrowing control unit 930 shifts from the level 2 to the level 0. This is a case when a state of the level 4 is not set. In this case, according to the condition 3 described above, a state of the access right borrowing control unit 930 is shifted from the level 2 to the level 0.

The following describes the operation of the access right borrowing control unit 930, with reference to the state transition diagram shown in FIG. 10.

The access right borrowing control unit 930 is in the state of the level 0 by default. In this state, a mask signal with respect to the request mask unit 912 is always Low, and is output to a signal line 67. As for a mask signal to be output to the request mask unit 922, the access right borrowing control unit 930 compares the access frequency information, which has been output from the access frequency management 921, to the permissive access frequency information, which has been output from the borrowing parameter storage unit 923. When an access frequency indicated by the access frequency information exceeds a permissive access frequency indicated by the permissive access frequency information, a mask signal indicating Hi is output to a signal line 77. When the access frequency does not exceed the permissive access frequency, a mask signal indicating Low is output to the signal line 77.

When the access right borrowing control unit 930 is in the state of the level 1, a mask signal for the request mask unit 922 is always set to be Hi, and is output to the signal line 77. Then, as for a mask signal for the request mask unit 912, the access right borrowing control unit 930 compares (i) the value of the access frequency information that is output from the access frequency management unit 911, to (ii) the total number of the value of the permissive access frequency information of the processor 810, which is sent from the borrowing parameter storage unit 923, and the a maximum time period in which an access right can be borrowed. When the value of the access frequency information exceeds the total number, a mask signal indicating Hi is output to the signal line 67. When the value of the access frequency information does not exceed the total number, a mask signal indicating Low is output to the signal line 67.

When the access right borrowing control unit 930 is in the state of the level 2, a mask signal for the request mask unit 912 is always set to be Hi, and is output to the signal line 67. As for a mask signal to be output to the request mask unit 922, the access right borrowing control unit 930 compares the access frequency information, which has been output from the access frequency management unit 921, to the permissive access frequency information, which has been output from the borrowing parameter storage unit 923. When the access frequency exceeds the permissive access frequency, a mask signal indicating Hi is output to the signal line 77. When the access frequency does not exceed the permissive access frequency, the Low mask signal is output to the signal line 77.

When the access right borrowing control unit 930 is in the state of the level 3, a mask signal for the request mask unit 912 is output in the following manners. First, the access right borrowing control unit 930 compares the access frequency information that has been output from the access frequency management unit 911, to the permissive access frequency information of the processor 810 that has been output from the borrowing parameter storage unit 923. When the access frequency exceeds the permissive access frequency, a mask signal indicating Hi is output to the signal line 67. When the access frequency does not exceed the permissive access frequency, a mask signal indicating Low is output to the signal line 67. Then, as for the request mask unit 922, the access right borrowing control unit 930 compares the access frequency information that has been output from the access frequency management unit 921, to the permissive access frequency information of the master 811, which has been output from the borrowing parameter storage unit 923. When the access frequency exceeds the permissive access frequency, a mask signal indicating Hi is output to the signal line 77. When the access frequency does not exceed the permissive access frequency, a mask signal indicating Low is output to the signal line 77.

The above completes the operation of the general request regulation unit 830. In the present invention, the access control device 800 includes the master selection unit 821. When the master 811 executes access at a predetermined rate or above, and the advance access counter is 1 or more, the master selection unit 821 prioritizes the access request from the processor 810. Accordingly, the master selection unit 821 outputs the access request to the general request regulation unit 830. This means that the general request regulation unit 830 receives only the access request from the processor 810. Therefore, the access request of the processor 810 is always granted, whereby the processor 810 accesses the shared memory.

Furthermore, in a case that the processor has an access request, even though the advance access counter of the master in the master selection unit 821 is zero, the general request regulation unit 830 executes control to allocate the access right of the master to the processor, within a range in which the bandwidth of the master is guaranteed. Therefore, it is possible to have a structure in which the access request of the processor is given a priority to be output to the arbitration unit 840.

In other words, in the present embodiment, in a case that the master has executed an advance access just before an access request of the processor occurs, and thus the access that is executed at a predetermined rate has a margin, the master selection unit 821 prioritizes an access of the processor. Then, the general request regulation unit 830 receives the access request of the processor, resulting in the access of the processor being executed. Furthermore, even though the master has not executed the advance access, the general request regulation unit 830 temporarily allocates a resource of the master to the processor, within a range in which the master is guaranteed for the access at a predetermined rate, thereby outputting the access request of the processor. Therefore, with the master selection unit 821, the responsiveness to the access request of the processor is further improved.

<Variations>

While the access control device of the present invention has been described in accordance with the specific embodiments outlined above, it is evident that the embodiments of the access control device are not limited to such. The following cases are also included in the present invention.

(1) In the above-described embodiments described above, the shared memory, the processor, and the masters are not included in the access control device 100. However, they may be included in the access control device 100.

(2) In the first embodiment described above, the structure includes one processor and three masters. In the second embodiment described above, the structure includes one processor and one master. However, the numbers of processors and masters are not limited to such. For example, the structure may include two processors and four masters. In this case, a signal line that receives access requests from both of the processors is connected to master selection units, which are connected to the masters.

(3) In the above-described embodiments, each of the master selection units selects from among the processor and the masters. However, instead of the processor, the master selection unit may select from among the masters and a master that requires yield performance, such as graphics. This is because, in a master that performs graphic processing and such, the more the master accesses the shared memory, the more the processing efficiency is increased. When the master selection unit selects such a master from among other masters, resulting in increasing the priority of a resource allocation, the processing efficiency of DVD players and such can be improved.

(4) In the above-described embodiments, the master selection unit may have a structure in which a register selects which processor or master uses a resource which is secured as a result of an advance access. Specifically, each of the processor and the masters may be provided a corresponding on/off shift register. To the master selection units, the master that is supposed to execute access in principle may directly input an access request signal. The other processor or masters may input signals that are obtained by masking their access requests with values set by the on/off shift registers.

With the above-described structure, according to a set value of the register, a master to increase the responsiveness to an access request is selected arbitrarily. Therefore, it is possible, for example, to change a master that can increase the responsiveness, depending on an executing application of the system. Specifically, for example, when an electronic program guide is displayed, the effect of the above-described function may be allocated to a graphic master. When Java (registered trademark) application is in operation, the effect may be allocated to a CPU.

(5) In the above-described embodiments, when the advance access counter is 1 or more, only the processor can interrupt to execute access. However, the first master may interrupt the access of the second master to execute access.

(6) In the above-described embodiments, the parameter storage unit in the request regulation unit already stores the parameters. However, the parameter storage unit may receive the parameters from the CPU that controls the whole access control device. Alternatively, the access control device may include an operation panel or such that receives an input operation from a user, so that the user can input the parameters to the parameter storage unit.

Also, the above-described borrowing parameter storage unit receives the parameters that are input by a user from outside. However, it is possible to receive the parameters from a CPU that controls the whole access control device.

Furthermore, the parameter storage unit and the borrowing parameter storage unit may be provided as one storage unit to store each of the parameters.

(7) In the above-described embodiments, the access-guaranteed period consists of 10 clocks. However, it is not limited to such. The access-guaranteed period may consist of any number of clocks, as long as the number of clocks specifies X, in a case that the masters execute access for Y clocks out of X clocks. For example, the period may consist of 100 clocks. Furthermore, the length of the access-guaranteed periods may vary, depending on each of the masters. For example, the access-guaranteed period of master 1 may be set as 20 clocks, and the access-guaranteed period of master 2 may be set as 50 clocks.

Also, in the above-described embodiments, the access rate of the masters is set as 3 times during the 10 clocks. However, the access rate may be, for example, 2 times or 5 times. Furthermore, in the access-guaranteed period of each of the masters, the required number of accesses varies, depending on the type of operations. Therefore, the access rates may vary depending on the masters.

(8) In the above-described embodiments, the number of accesses is used to control which master accesses the shared memory. However, instead of the number of accesses, the number of bytes transferred, in a case that the master accesses the shared memory and transfers data, may be used as a unit to execute an accurate rate control. In that case, the access frequency management unit of the request regulation unit may receive the number of bytes transferred with respect to an access request from the connected master or the processor.

(9) In the above-described embodiments, the parameter storage unit is provided in the request regulation unit. However, the parameter storage unit may be independently provided outside the request regulation unit. Then, a control block that requires a parameter, which is stored in the parameter storage unit, may access the parameter storage unit.

(10) Each functional part of the access control device may be realized by one or more LSIs (Large Scale Integration) and VLSIs (Very Large Scale Integration), and may also be a system LSI that executes all the functions of each functional part with a single LSI.

(11) The present invention may be a method for improving responsiveness to an access request of the processor described in the above embodiments, and may also be a computer program that indicates an operation procedure to cause a computer to execute the method.

An access regulation device according to the present invention may be provided in an apparatus that executes a plurality of operations, such as a BD player, and used as a device having improved responsiveness to a sudden request from a user.

The invention claimed is:

1. An access control device that controls access of a plurality of masters to a shared memory, the access control device comprising:
a first access control unit operable to, in response to an access request to the shared memory from a first master of the plurality of masters, (i) cause the first master to access the shared memory for each predetermined period using a predetermined resource allocated to the first master in advance, and (ii), when an available resource other than the predetermined resource allocated to the first master in advance exists, cause the first master to access the shared memory using the available resource and the predetermined resource allocated to the first master in advance; and
a second access control unit operable to, in response to an access request to the shared memory from a second master of the plurality of masters, cause the second master to access the shared memory using the predetermined resource allocated to the first master in advance having an upper limit of use by the second master set as an amount of the available resource used by the first master, during a predetermined period subsequent to a predetermined period in which the first access control unit has caused the first master to use the available resource.

2. The access control device of claim 1,
wherein the access control device further comprises an advance access count unit operable to count a number of times the first master has accessed the shared memory, when the first master accesses the shared memory using the available resource, and
wherein the second access control unit causes the second master to access the shared memory using the predetermined resource allocated to the first master in advance, when the number of accesses counted by the advance access count unit is 1 or more.

3. The access control device of claim 2,
wherein the advance access count unit executes, when the second access control unit has caused the second master to access the shared memory, one of (i) decrementing the number of accesses counted by the advance access count unit and (ii) resetting the number of accesses to zero.

4. The access control device of claim 1,
wherein the access control device further comprises a parameter storage unit that stores a rate parameter specifying the predetermined resource allocated to the first master in advance, and
wherein the first access control unit causes the first master to access the shared memory using the predetermined resource allocated to the first master in advance, based on the rate parameter stored in the parameter storage unit.

5. The access control device of claim 1, further comprising a general access unit operable to, when the first master and the second master share a resource for accessing the shared memory, cause the first master to lend and borrow an access right to/from the second master, within a range of the shared resource, the access right being for accessing the shared memory, so as to cause the second master to access the shared memory.

6. The access control device of claim 5,
wherein the access control device further comprises a borrowing parameter storage unit that stores (i) information indicating access-guaranteed periods of the first master and the second master, (ii) permissive access frequency information indicating a maximum number of accesses that are permitted during the access-guaranteed period, (iii) information indicating a maximum period in which the access right is permitted to be borrowed, and (iv) information indicating a time between a preceding borrowing of the access right and a subsequent borrowing of the access right, and
wherein the general access unit, based on the information stored in the borrowing parameter storage unit, causes the first master to lend and borrow the access right to/from the second master, so that the first master and the second master access the shared memory.

7. An access control integrated circuit that controls access of a plurality of masters to a shared memory, the access control integrated circuit comprising:
a first access control unit operable to, in response to an access request to the shared memory from a first master of the plurality of masters, (i) cause the first master to access the shared memory for each predetermined period using a predetermined resource allocated to the first master in advance, and (ii), when an available resource other than the predetermined resource allocated to the first master in advance exists, cause the first master to access the shared memory using the available resource and the predetermined resource allocated to the first master in advance; and
a second access control unit operable to, in response to an access request to the shared memory from a second master of the plurality of masters, cause the second master to access the shared memory using the predetermined resource allocated to the first master in advance having an upper limit of use by the second master set as an amount of the available resource used by the first master, during a predetermined period subsequent to a predetermined period in which the first access control unit has caused the first master to use the available resource.

8. An access control method that controls access of a plurality of masters to a shared memory, the access control method comprising:

a first access control step of, in response to an access request to the shared memory from a first master of the plurality of masters, (i) causing the first master to access the shared memory for each predetermined period using a predetermined resource allocated to the first master in advance, and (ii), when an available resource other than the predetermined resource allocated to the first master in advance exists, causing the first master to access the shared memory using the available resource and the predetermined resource allocated to the first master in advance; and a second access control step of, in response to an access request to the shared memory from a second master of the plurality of masters, causing the second master to access the shared memory using the predetermined resource allocated to the first master in advance having an upper limit of use by the second master set as an amount of the available resource used by the first master, during a predetermined period subsequent to a predetermined period in which the first access control step has caused the first master to use the available resource.

* * * * *